United States Patent
Walde et al.

(10) Patent No.: US 9,669,725 B2
(45) Date of Patent: Jun. 6, 2017

(54) STORE FOR ELECTRICAL ENERGY, AND HOLDING DEVICE FOR AT LEAST ONE STORE FOR AN ELECTRICALLY DRIVABLE VEHICLE

(71) Applicant: ROBERT BOSCH GMBH, Stuttgart (DE)

(72) Inventors: Norbert Walde, Pleinfeld (DE);
Philipp Kohlrausch, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 232 days.

(21) Appl. No.: 14/386,978

(22) PCT Filed: Feb. 19, 2013

(86) PCT No.: PCT/EP2013/053255
§ 371 (c)(1),
(2) Date: Sep. 22, 2014

(87) PCT Pub. No.: WO2013/139549
PCT Pub. Date: Sep. 26, 2013

(65) Prior Publication Data
US 2015/0048781 A1    Feb. 19, 2015

(30) Foreign Application Priority Data
Mar. 21, 2012  (DE) .................. 10 2012 204 538

(51) Int. Cl.
*H02J 7/00* (2006.01)
*B60L 11/18* (2006.01)
(Continued)

(52) U.S. Cl.
CPC ......... *B60L 11/1861* (2013.01); *B60L 3/0046* (2013.01); *B60L 3/12* (2013.01);
(Continued)

(58) Field of Classification Search
USPC .......................................................... 320/106
See application file for complete search history.

(56) References Cited

U.S. PATENT DOCUMENTS 5,357,177 A * 10/1994 Fey ..................... B62M 25/08
                                                                318/3
5,703,467 A    12/1997 Patino
(Continued)

FOREIGN PATENT DOCUMENTS

| CN | 102177600 A | 9/2011 |
|---|---|---|
| CN | 102231542 A | 11/2011 |
| WO | 2012029317 A | 2/2012 |

*Primary Examiner* — Yalkew Fantu
(74) *Attorney, Agent, or Firm* — Norton Rose Fulbright US LLP; Gerard Messina

(57) ABSTRACT

A store for electrical energy, and a holding device for at least two stores for electrical energy, in each of which a voltage divider is situated which is contactable in each via an external, additional electrical contact. Since the division ratio of the voltage divider within the holding device is characteristic for a specific holder, a voltage measurement at the tapping point between the stores' resistors is useable to determine which holder of the holding device the store is in. During a charging operation without the holding device no voltage divider is connected to the store, it is possible to identify a particular holder and to determine that the store is not in a holding device for charging. Since the store or its battery management system itself provides for energization of its own voltage divider, recognition may take place regardless of whether a charging device is directly connected to the holding device or store. Also, a wake-up function is provided via the additional electrical contact of the store.

12 Claims, 3 Drawing Sheets

(51) Int. Cl.
  *B60L 3/00* (2006.01)
  *B60L 3/12* (2006.01)
  *B60L 11/00* (2006.01)

(52) U.S. Cl.
  CPC ......... *B60L 11/007* (2013.01); *B60L 11/1816* (2013.01); *B60L 11/1822* (2013.01); *B60L 11/1846* (2013.01); *B60L 11/1855* (2013.01); *B60L 11/1864* (2013.01); *B60L 11/1868* (2013.01); *B60L 11/1887* (2013.01); *H02J 7/0021* (2013.01); *H02J 7/0027* (2013.01); *H02J 7/0068* (2013.01); *B60L 2200/12* (2013.01); *B60L 2200/36* (2013.01); *B60L 2240/545* (2013.01); *B60L 2240/547* (2013.01); *B60L 2240/549* (2013.01); *B60L 2250/12* (2013.01); *B60L 2250/16* (2013.01); *Y02T 10/7044* (2013.01); *Y02T 10/7055* (2013.01); *Y02T 10/7061* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y02T 90/34* (2013.01); *Y04S 30/14* (2013.01)

(56) References Cited

U.S. PATENT DOCUMENTS

| | | | | |
|---|---|---|---|---|
| 6,002,240 | A * | 12/1999 | McMahan | H01M 10/4257 320/150 |
| 6,132,327 | A * | 10/2000 | Campagnolo | B62M 25/08 474/103 |
| 6,184,660 | B1 * | 2/2001 | Hatular | H02J 7/022 320/139 |
| 6,917,283 | B2 * | 7/2005 | Takeda | B62J 99/00 340/432 |
| 7,630,810 | B2 * | 12/2009 | Guderzo | B62M 9/122 474/116 |
| 2004/0005947 | A1 * | 1/2004 | Shahana | B62M 25/02 474/78 |
| 2011/0198103 | A1 * | 8/2011 | Suzuki | B25F 5/00 173/46 |

* cited by examiner

STORE FOR ELECTRICAL ENERGY, AND HOLDING DEVICE FOR AT LEAST ONE STORE FOR AN ELECTRICALLY DRIVABLE VEHICLE

FIELD OF THE INVENTION

The present invention relates to electrically drivable vehicles such as bicycles or automobiles.

BACKGROUND INFORMATION

In such vehicles, stores for electrical energy in some models may be individually introduced into the vehicle in a comparatively uncomplicated manner, for example to equip the vehicle for an imminent trip, and may subsequently be removed from the vehicle in order to be replaced by a fully charged energy store. In order to not unnecessarily increase the vehicle weight, the number of energy stores introduced into the vehicle may occasionally be adapted to the estimated travel distance. However, withdrawing electrical energy from multiple stores at the same time entails the risk that so-called charge reversal processes between energy stores of different voltage or states of charge may result in very high currents which could damage the system and/or the stores themselves. This problem exists during operation (energy withdrawal) as well as during the charging process (energy supply).

For this reason, in the related art it is believed to be understood to use so-called "active power management" (controlled connection of batteries with the aid of a battery management system) to carry out the energy withdrawal or the energy input in each case only with regard to a predetermined store of the assembly. When the store has reached a predefined state of charge or discharge, the active power management provides for disconnection of the electrical connections to the store and connection to a second store. One alternative to power management is a passive network, composed of diodes, which prevents undesirable charge reversal processes. However, the latter has the disadvantage that high losses result, and large diodes and possibly active cooling are required.

For an intelligent active power management of a storage assembly, it is necessary that accurate information is present concerning how the individual store may be addressed (connected). In other words, it must be possible to determine which store is situated in which slot of a so-called frame (mounting for the storage assembly). The object of the present invention, therefore, is to provide a cost-effective and robust option for identifying the stores of a storage assembly with little outlay of hardware and little energy consumption, and with little additional system complexity.

SUMMARY OF THE INVENTION

The above-mentioned object may be achieved by a store for electrical energy having the features according to the description herein. The store may, for example, be an electrochemical store (battery or fuel cell, for example) which is situated in a housing. A first electrical contact (positive pole) and a second electrical contact (negative pole) are situated at the outer side of the housing in order to transmit electrical energy into the store or out of the store. In addition, the store may include a voltage divider which may be supplied with voltage by a first switch. In other words, multiple resistors (ohmic or complex) connected in series may be acted on by electrical energy when the switch is closed. An additional electrical contact via which a voltage tap may take place between two components of the voltage divider may be situated at a predetermined position of the voltage divider.

According to the present invention, in addition an evaluation unit may be situated in the store, which is configured for measuring an electrical voltage which is present at the additional contact with respect to a predefined reference potential (ground, for example) and for comparing the measured voltage to a predefined reference value or predefined reference values. For this purpose, the store may additionally include an information store in which on the one hand reference value ranges and on the other hand associated positions within a holding device for stores are connected to one another and stored. In other words, an unambiguous association of the store with an individual holder for one store provided in the holding device may be achieved via a voltage measurement.

In addition, the store may include additional control units such as bus control units (CAN, MOST, FlexRay) via which the store may exchange information with its periphery and store obtained information in its information store. For example, this may be updated associations between reference value ranges and holding positions within a holding device. It is understood as a matter of course that the store also includes a unit for storing electrical energy (lithium-ion cells, for example), with the aid of which a vehicle, for example, may be driven.

The further descriptions herein provide further refinements of the present invention.

According to one refinement, the store may include a second switch which is connected to a voltage source via a resistor. The voltage source may be provided within the store or be situated externally (i.e., outside the store). One specific embodiment for the switch may be a field effect transistor, a MOSFET, for example, whose gate terminal is configured to receive a control signal. A so-called "wake-up line" is connected at a tap between the switch and the resistor, and in the case of an open switch assumes the potential of the voltage source, and in the case of a conducting second switch assumes ground potential. A control line (the gate terminal of the MOSFET, for example) is connected to the additional contact of the store, so that a predefined potential which is applied to the additional contact of the store switches on (conductively switches) the switch, and an electrical potential which is applied to the additional contact below the predefined threshold value opens the second switch. Of course, the opposite mode of operation may likewise be implemented as a function of the switch used or as a function of the type of transistor used.

The evaluation unit of the store may also be configured to intermittently conductively switch on the first switch (which is part of the voltage divider of the store). In other words, the additional contact situated between the resistors of the voltage divider is increased to a predefined electrical potential by the current flow which results in response to a control signal that is applied to the first switch. Alternatively or additionally, the evaluation unit may be configured to carry out an intermittent measurement of the electrical voltage which is present at the additional contact. The voltage measurement and the switching on of the first switch may take place at the same time, so that the voltage measurement takes place at a point in time when the current flow of the additional electrical contact increases to an electrical potential that is different from 0 V (corresponding to ground). This results in the option of minimizing the energy that is required for measuring the electrical voltage and for increasing the electrical potential.

According to another aspect of the present invention, a holding device for at least two stores for electrical energy is provided with a first holder for one store. The store to be accommodated may, as discussed above, be a store which is configured for electrical energy. The holding device contains a first electrical contact, associated with the first holder, and a second electrical contact, associated with the second holder, for transmitting electrical energy into a store situated in the holder or for transmitting electrical energy out of the store situated in the holder. Furthermore, a first additional electrical contact is situated within the holder, and is configured to be connected to an additional electrical contact of a store which is present in the holder. In particular, a connection between the corresponding contacts of the holder and of the store may be automatically established when a store is inserted into the holder.

The holding device, i.e., the frame, may include a first voltage divider which is associated with the first holder and whose division ratio is associated with the first holder. In other words, the division ratio is selected in such a way that there is no second holder having the same division ratio within the holding device. A tap between two elements of the voltage divider of the holder may be configured to be electrically connected via the first additional contact to an additional contact of a store which is inserted into the holder. In other words, a voltage divider which is contained in a store that has been inserted into the holder may be connected to the voltage divider of the holder in such a way that the taps (i.e., the points between two elements in each case of a particular voltage divider) are connected to one another. In other words, the elements, in each case connected to ground, of the particular voltage divider are connected in parallel. Since each division ratio of a voltage divider makes a store unambiguously identifiable with respect to a plurality of other stores, and a division ratio of a voltage divider situated in a holder makes the particular holder unambiguously identifiable with respect to other holders, by a suitable selection of the division ratios it is also possible to identify any arbitrary combination of a store and a holder based on the resulting electrical circuit, and to ascertain the combination via a voltage measurement.

The holding device also may have an electrical terminal which is configured to electrically connect in each case the first electrical contact as well as the second electrical contact (positive pole and negative pole, respectively, for transmitting the electrical energy), and also the additional electrical contact of the holder, to an electrical connector such as a plug-in connector. For this purpose, the electrical terminal may be configured as a socket into which a plug-in connector of a corresponding power pack as a charger may be inserted. The voltage divider of the holder may be configured to be supplied with electrical energy via the electrical terminal. The electrical terminal may advantageously represent a group terminal, so that the above-mentioned electrical contacts are combined within a housing, thus simplifying the plug-in operation.

According to another aspect of the present invention, an electrically drivable vehicle is provided which in particular is configured as a bicycle or as an automobile (a passenger vehicle or truck, for example). The vehicle according to the present invention includes a holding device as discussed above. Alternatively or additionally, the vehicle may include a store as discussed above. Of course, the vehicle may also include a bus system to which the holding device according to the present invention and/or the store according to the present invention is/are connectable. In particular, the holding device and the store may be automatically connected to the bus system during operation, in other words, automatically integrated into the bus system after the store has been inserted into the holding device situated on or in the vehicle.

Exemplary embodiments of the present invention are described in greater detail below with reference to the appended drawings.

DETAILED DESCRIPTION

Figure 1:
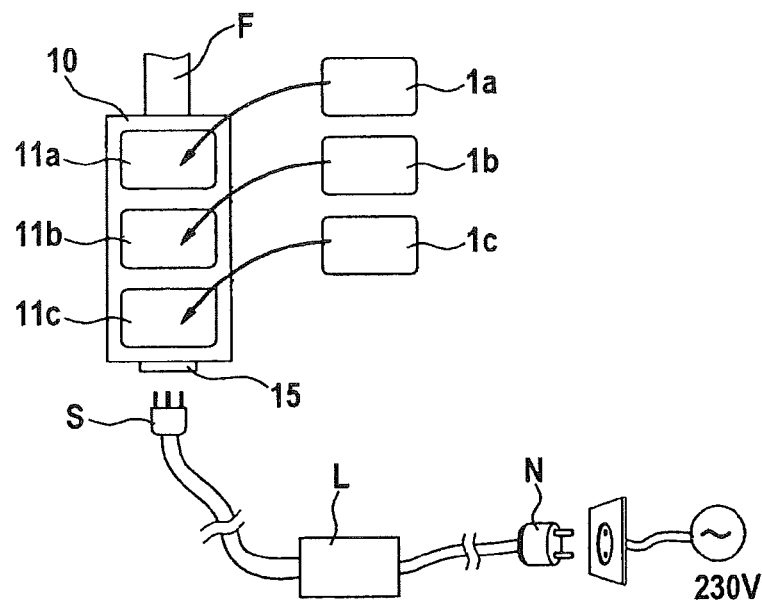
FIG. 1 shows a schematic overview of components of the present invention.

In FIG. 1, a holding device 10 is situated on a frame part of a bicycle F. Holders 11a, 11b, and 11c are configured to accommodate stores 1a, 1b, and 1c, respectively. An electrical terminal 15 is provided at the lower end of holding device 10, via which holding device 10 may be connected to a charging device L via a plug-in connector S. The charging device is configured to draw power from an electrical power supply (230 V, for example) via a power plug N. The illustrated components are discussed in greater detail below with reference to the other figures.

Figure 2:
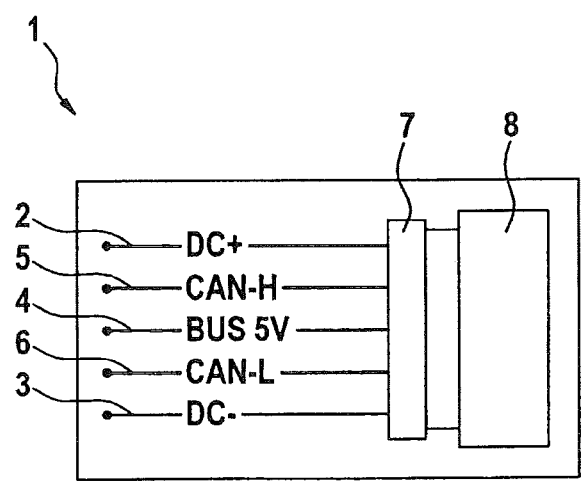
FIG. 2 shows a schematic overview of terminals and components of a store according to the present invention.

FIG. 2 shows a store 1 including five electrical terminals. A positive pole as first electrical contact 2 and a negative pole as second electrical contact 3 are provided for transmitting the electrical energy from cells 8, whereby cells 8 may be lithium-ion cells or lithium polymer cells. A so-called "CAN high" terminal (CAN-H) 5 and a "CAN low" terminal (CAN-L) 6 are provided for connecting battery management system (BMS) 7 to a local bus system. In addition, a "bus 5V" terminal is provided as an additional contact 4, whose mode of operation is described in greater detail in particular in conjunction with FIG. 6. Battery management system 7 is configured to exchange information with the periphery and to establish, for example, an electrical connection of cells 8 to electrical contacts 2 and 3 as a function of ascertained information.

Figure 3:
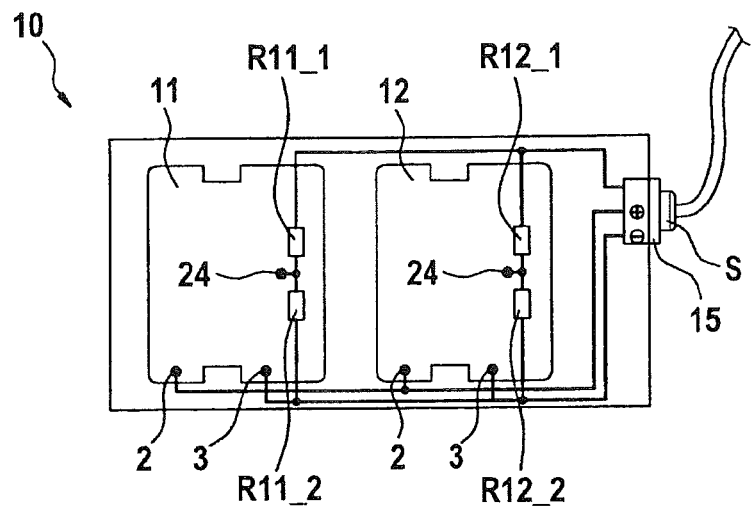
FIG. 3 shows an overview of components and terminals of a holding device according to the present invention.

FIG. 3 shows a holding device 10 for two stores which may be respectively inserted into holders 11 and 12. Electrical contacts 2 and 3 are provided in each case in first holder 11 and second holder 12 for transmitting the electrical energy between holding device 10 and stores 1. The electrical contacts are connected in each case to an electrical terminal 15 of holding device 10 via electrical lines. A plug-in connector S of a charging device L (not illustrated) is connected to electrical terminal 15. In addition, ohmic voltage dividers are situated in holders 11 and 12, the voltage divider of first holder 11 being composed of a first resistor $R_{11\_1}$ and a second resistor $R_{11\_2}$, and the voltage divider of second holder 12 being composed of a first resistor $R_{12\_1}$ and a second resistor $R_{12\_2}$. An additional electrical contact 24 is situated in each case between the resistors of the voltage dividers, via which stores inserted into the holders 11 and 12 may be connected to a voltage tap of the voltage dividers. The voltage dividers of holding device 10 are supplied with a direct voltage (5 V, for example) via an additional electrical contact of charging device L, and on their oppositely situated terminal side are connected to the negative pole as second electrical contact 3.

Figure 4:
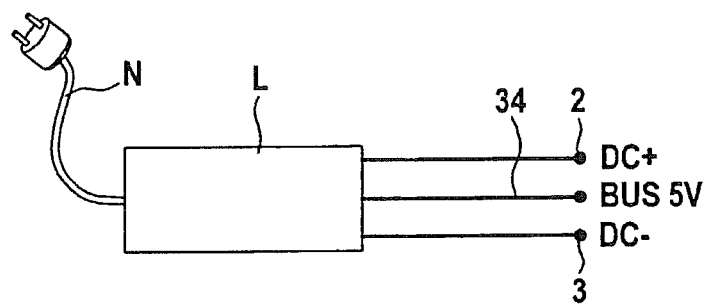
FIG. 4 shows an overview of components and terminals of a charging device (charger) which is usable with the system according to the present invention.

FIG. 4 shows a charging device L which has a power plug N for connection to an electrical power supply (230 V alternating voltage, for example). Voltage converters (not illustrated) which are able to convert voltage between the power supply voltage and a voltage necessary for charging electrical stores 1 (30 V to 40 V direct voltage, for example) are present within charging device L. This electrical supply voltage may be delivered via electrical contacts 2 and 3 either to a holding device 10 or directly to a store 1. In addition, charging device L includes a bus 5V terminal as an additional electrical contact 34. After connection to a holding device 10, charging device L may supply voltage dividers $R_{11\_1}$ and $R_{11\_2}$ and $R_{12\_1}$ and $R_{12\_2}$ provided in holding device 10 with voltage via this bus 5V contact. If charging device L is directly connected to a store 1 (i.e., not connected via a holding device 10), bus 5V contact 34 is connected to additional electrical contact 4 of store 1, and thus "wakes up" the battery management system of a store 1, as will be discussed in conjunction with FIG. 6.

Figure 5:
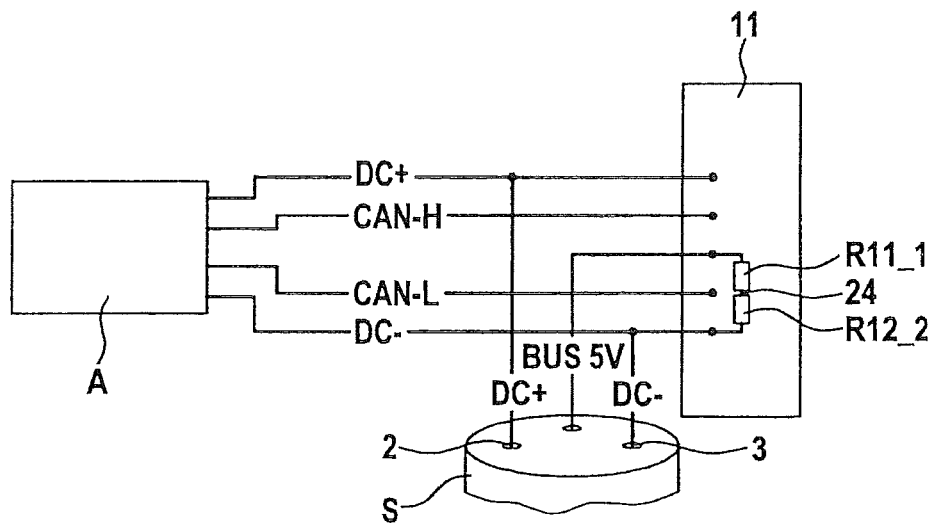
FIG. 5 shows one possible configuration of a holder in a holding device during charging of a store in the holding device.

FIG. 5 shows a holder 11 of a holding device 10, which on the one hand is connected to energy system and information system A (DC+, DC−; CAN-H, CAN-L) of a vehicle F, and on the other hand is connected to a plug-in connector S of a charging device L (not illustrated). The voltage divider of holder 11, composed of resistors $R_{11\_1}$ and $R_{11\_2}$, is indicated between the bus 5V contact and second electrical contact 3.

Figure 6:
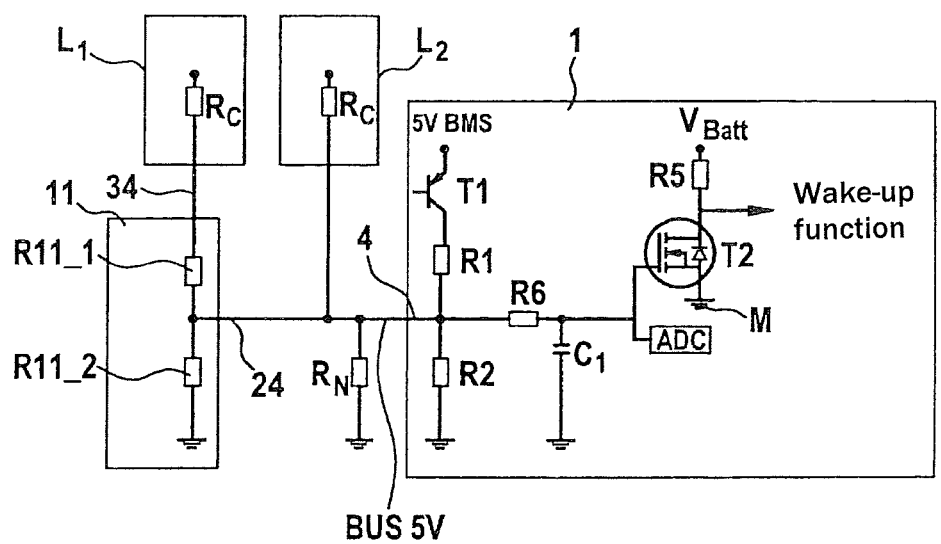
FIG. 6 shows an overview of possible configurations between a charging device, a store according to the present invention, and (in one example) a holding device according to the present invention.

FIG. 6 shows possible configurations and the electrical connections of components according to the present invention via the particular additional electrical contacts 4, 24, 34 of a store 1, a holder 11, and a charging device L. The lines for transporting the electrical energy from cells 8 are not illustrated for the sake of clarity. In addition, charging devices $L_1$ and $L_2$ are understood as alternatives. In other words, initially the case is discussed in which charging device $L_1$ is connected to store 1 via holder 11, and subsequently the alternative is discussed in which charging device $L_2$ is directly connected to store 1.

In a first case, charging device $L_1$ is electrically connected to a holding device 10 in which illustrated holder 11 is situated. Resistors $R_{11\_1}$ and $R_{11\_2}$ as voltage dividers are connected to ground in holder 11. An additional electrical contact 24 of holder 11 is provided between the two resistors $R_{11\_1}$ and $R_{11\_2}$. Between store 1 which is inserted into holder 11 and holder 11, a parasitic shunt in the form of a resistor $R_N$ between additional electrical contact 4 of store 1 and the chassis of vehicle F is taken into account. It is understood as a matter of course that the parasitic shunt models environmental conditions, and is not actually provided as an electrical component. Within store 1, a voltage divider composed of resistors R1 and R2 is connected to ground. A bipolar transistor T1 as the first switch is provided between resistor R1 and supply voltage 5V BMS. An input resistor R6 which connects the voltage divider to an analog/digital converter (ADC) is connected to the voltage tap of the voltage divider composed of resistors R1 and R2. With the aid of the ADC, store 1 is configured to measure and categorize a voltage within the scope of its resolution. A capacitor C1 is connected to ground between resistor R6 and the analog/digital converter. The gate terminal of a second transistor T2 as the second switch is connected to the interconnection point between resistor R6 and the analog/digital converter. Transistor T2 is configured as a MOSFET, and is situated between ground and a resistor R5, or between ground and a wake-up line. On the other hand, resistor R5 is connected to a supply voltage $V_{batt}$, which in the illustrated example is provided by memory cells 8 of store 1.

The mode of operation of the first alternative is described below, which represents the case in which charging device $L_1$ is connected to store 1 via holding device 10 or holder 11. Initially, the case is described in which the battery management system of store 1 has been in "deep sleep," and as charging device $L_1$ has been connected to holding device 10. Since additional electrical contact 34 of charging device $L_1$ supplies the voltage divider of holder 11 with electrical power, the additional electrical contact increases the potential of additional electrical terminal (contact) 4 of store 1 to a potential that is different from 0. MOSFET T2, which until now has been blocking, is thus also supplied with electrical power via resistor R6, and switches between source and drain ("one"). Consequently, a current flow between voltage source $V_{batt}$ and electrical ground M will result in a drop in the potential at the wake-up line, since voltage drops at resistor R5 due to the current flow. In other words, store 1 or its battery management system has been awakened, and subsequently must determine whether it is to be charged or discharged, and whether other stores which may be present in the assembly are to be taken into account. After waking up, the battery management system of store 1 will therefore carry out a voltage measurement, using the analog/digital converter, in order to determine its position and a voltage which is associated with its instantaneous position. This voltage value is defined by the 5-V voltage of charging device $L_1$, the (low) internal resistance Rc of the charging device, first resistor $R_{11\_1}$, and resistors $R_{11\_2}$, $R_N$, and R2 which are connected in parallel. Since store 1 recognizes resistor R2, resistance Rc is very small (negligible) compared to the other resistors, parasitic shunt $R_N$ has very high resistance and is taken into account by the intervals between the categorized voltages, and the voltage of the charging device is 5 V, the ratio of the voltage divider of holder 11 may be ascertained. At the minimum, however, by a suitable selection of the voltage divider ratios defined in the system it is possible to categorize the voltage measured by the ADC so that in each case the particular holder 11 occupied by store 1 at that moment may be identified. The battery management system of store 1 may subsequently send information, in which its identity, its instantaneous position (address), as well as state of charge data, temperature, and other parameters may be contained, to its periphery via CAN lines (not illustrated). Depending on which information the battery management system of store 1 then receives via CAN lines (for example, from the energy master of the system), the battery management system may enable delivery or input of electrical power from or to cells 8, i.e., may connect the contacts of cells 8 to the vehicle electrical system.

The alternative is discussed below in which charging device $L_2$ is directly connected to additional electrical contact 4 of store 1. The configuration and the processes are essentially identical to those of alternative 1. However, in the present case no voltage divider of a holder 11 is involved, so that a measured voltage value after the battery management system of store 1 wakes up and after the switching-on operations die away essentially corresponds to the 5-V voltage of charging device L. Correspondingly, the battery management system of store 1 recognizes that charging device L is directly connected to store 1 and that no further stores in the assembly are to be taken into account. Accordingly, the battery management system of store 1 initiates connection of cells 8 of store 1 to the power lines (not illustrated) in order to receive electrical energy from charging device $L_2$. It is thus ensured that a charging operation may also be carried out independently of a holding device 10 or without corresponding CAN messages.

The case is discussed below in which store 1 is inserted into a holding device 10, and a user would like to use bicycle F. At the start of the travel operation, the user wakes up the system via a user interaction (for example, by pressing a start button) which directly wakes up store 1 via CAN lines (not illustrated), for example, or a wake-up line, for example. Since no charging device L is connected to store 1 or to a holding device 10 during the travel operation, the battery management system is configured to autonomously close the first switch in the form of bipolar transistor T1, resulting in energization of the voltage divider composed of resistors R1 and R2. When store 1 is properly inserted into a holder 11, resistor $R_{11\_2}$ is connected in parallel to resistor R2, so that with the aid of a voltage measurement it is possible to determine in which holder of holding device 10 store 1 is inserted at that moment. Since for the case that store 1 is not inserted into a holder, in addition no resistor is connected in parallel to second resistor R2 of the store's own voltage divider, this case may also be recognized by store 1. As explained above, sending of information to a master of the system (via CAN lines, for example) takes place in the next step, which decides which of stores 1 possibly present in the assembly is to be discharged for the purpose of transportation. Upon appropriate feedback from the master to the particular store 1, this store delivers the energy contained in its cells 8 to a drive unit A of bicycle F via a first contact and a second contact (not illustrated).

The information which store 1 sends via the local bus system may of course also be used, for example, to supply a display, present on the vehicle, with information which indicates to the user the state in which the memory cells of the storage assembly are in, and the estimated remaining travel distance which results therefrom.

As described above, the decision concerning which store 1 is to be charged or discharged at a particular point in time may be made by a unit often referred to as the "energy master," i.e., an entity for controlling the energy flows in the composite composed of stores and the drive unit. In principle, such an entity may be situated at any location in the assembly, so that all entities of the assembly which receive information sent via the CAN line, for example, could make such a decision. For example, a microprocessor situated in holding device 10 could receive information via the CAN bus concerning the occupancy of holders 11 and 12 with stores 1 and their states, and could control charging and discharging operations by sending appropriate information to stores 1 in the assembly via the bus. For this purpose, stores 1 each have their own CAN controller (control unit for assisting with CAN communication), with the aid of which they are able to receive and optionally acknowledge the information.

The voltage dividers according to the present invention may be acted on by electrical energy continuously or intermittently, the same as for a measurement of the resulting voltage at additional electrical contact 4, 24, on the one hand to allow reliable recognition of a changed system configuration, and on the other hand to minimize the expenditure of energy and measuring effort for such a recognition. In particular, an energization of the voltage dividers by the wake-up line in store 1 may be recognized, and a measurement of the resulting voltage by the ADC may be initiated only in response to such an energization.

Since store 1 or its battery management system is able to recognize whether it has switched bipolar transistor T1, as first switch, on or off, when the first switch is open and a voltage is measured at 0 V, it may be concluded that the charger is not connected. In other words, in this case no evaluation takes place, and store 1 is not charged and "sleeps" after a predefined time period, provided that no CAN messages to the contrary have been received. Prior to this time, the store may disconnect an electrical connection, which may be present, of its cells 8 to the electrical periphery of vehicle F in order to prevent discharging of cells 8. If bipolar transistor T1 is switched off and the ascertained voltage is greater than 0, it may be concluded that an external voltage source, for example in the form of a charging device L, is connected. For the case that store 1 is charged via a holder 11 of a holding device 10, holder 11 may be unambiguously identified with the aid of the voltage divider, which results from the interconnection of resistor R2 of store 1 and the voltage divider of holder 11. For the case that charging device L is directly plugged into store 1, a voltage value results which is close to the voltage (5 V, for example) which is delivered by additional electrical contact 34 of charging device L, since internal resistance Rc of charging device L is much smaller than the remaining electrical resistors of the system. This case may thus be unambiguously recognized as well, and an appropriate response may be made by the store. For the case that the ascertained voltage is 0 V when bipolar transistor T1 is switched off, it may be concluded that no charging device L is connected. If in such a case the battery management system would like to carry out an identification of that holder 11 in which store 1 is present at that moment, the battery management system initiates activation of bipolar transistor T1, in response to which a recognition may be made via the voltage value which results at additional electrical contact 4 of holder 11. For the case that no resistor is present which is connected in parallel to resistor R2, store 1 recognizes that it is not inserted into a holder 11. This results in a simple, reliable, and efficient option for recognizing states and the position of store 1, and for using the obtained information in conjunction with an electrically drivable vehicle.

In summary, a store for electrical energy as well as a holding device for at least two stores for electrical energy are provided, in which in each case a voltage divider is situated which is contactable in each case via an external, additional electrical contact. Since the division ratio of the voltage divider situated within the holding device is characteristic for a specific holder, a voltage measurement at the tapping point between the resistors of the stores may be used to determine which holder of the holding device the store is situated in. Since during a charging operation no voltage divider is connected to the store without the holding device, it is possible not only to identify a particular holder, but also to determine that the store is not situated in a holding device for charging. Since the store or its battery management system itself may provide for energization of its own voltage divider, recognition may take place regardless of whether a charging device is directly connected to the holding device or to the store. In addition, a wake-up function is provided via the additional electrical contact of the store.

The present invention has been described in detail above with reference to specific exemplary embodiments which are used for illustration. On this basis, however, there are numerous options for those skilled in the art to make modifications, to combine features of the disclosed exemplary embodiments with one another, and in particular to apply dimensioning rules without departing from the area of the present invention, whose scope of protection is defined by the appended claims.

What is claimed is:

1. A store for electrical energy, comprising:
   a housing;
   at least one first electrical contact and one second electrical contact at the outer side of the housing for transmitting electrical energy into the store or out of the store;
   a first switch, in particular in the form of a bipolar transistor;
   a voltage divider disposed within the store which is suppliable with voltage via the first switch;
   an additional electrical contact at the outer side of the housing for externally contacting a voltage tap between components of the voltage divider; and
   an evaluation unit to measure an electrical voltage which is present at the additional contact and to evaluate the measured electrical voltage with regard to predefined reference value ranges of electrical voltage.

2. The store of claim 1, further comprising:
   a second switch, in particular in the form of a field effect transistor, preferably a MOSFET, which is connected to a voltage source via a resistor and which is configured to establish a conductive connection between the resistor and the electrical ground in response to a voltage which is present at the additional electrical contact.

3. The store of claim 1, wherein the evaluation unit is configured to carry out an intermittent measurement of the electrical voltage which is present at the additional contact, or the store is configured to intermittently conductively switch on the first switch.

4. A holding device for at least two stores for electrical energy, comprising:
   a first holder for a store which includes:
   at least one first electrical contact and one second electrical contact to transmit electrical energy into a store or out of a store, and,
   an additional electrical contact to be connected to an additional electrical contact of a store which is inserted into the holder; and
   a first voltage divider which is associated with the first holder and disposed within the store, and having a division ratio which is associated with the first holder, wherein a tap of the voltage divider is connected to the first additional contact.

5. The holding device of claim 4, further comprising:
   an electrical terminal to electrically connect the first electrical contact, the second electrical contact, and the voltage divider to an electrical connector.

6. The store of claim 1, wherein the voltage divider is composed of ohmic resistors.

7. The store of claim 1, further comprising:
   an interface for a bus system.

8. An electrically drivable vehicle, in particular a bicycle, comprising:
   at least one of a store and a holding device;
   wherein the store for electrical energy includes:
   a housing;
   at least one first electrical contact and one second electrical contact at the outer side of the housing for transmitting electrical energy into the store or out of the store;
   a first switch, in particular in the form of a bipolar transistor;
   a voltage divider disposed within the store which is suppliable with voltage via the first switch;
   an additional electrical contact at the outer side of the housing for externally contacting a voltage tap between components of the voltage divider; and
   an evaluation unit to measure an electrical voltage which is present at the additional contact and to evaluate the measured electrical voltage with regard to predefined reference value ranges of electrical voltage; and
   wherein the holding device, which is for at least two stores for electrical energy, includes a first holder for a store which includes:
   at least one first electrical contact and one second electrical contact to transmit electrical energy into a store or out of a store, and,
   an additional electrical contact to be connected to an additional electrical contact of a store which is inserted into the holder; and
   a first voltage divider which is associated with the first holder, and having a division ratio which is associated with the first holder, wherein a tap of the voltage divider is connected to the first additional contact.

9. The holding device of claim 4, wherein the voltage divider is composed of ohmic resistors.

10. The holding device of claim 4, further comprising:
    an interface for a bus system.

11. The holding device of claim 4, further comprising:
    an interface for a bus system, in particular according to the CAN standard.

12. The store of claim 1, further comprising:
    an interface for a bus system, in particular according to the CAN standard.

* * * * *